United States Patent

[11] 3,563,483

[72] Inventor Masaaki Morita
Kanagawa-ken, Japan

[21] Appl. No. 803,332
[22] Filed Feb. 28, 1969
[45] Patented Feb. 16, 1971
[73] Assignee Sony Corporation
Tokyo, Japan
[32] Priority Mar. 1, 1968
[33] Japan
[31] 43/13270

[54] ENDLESS TAPE CARTRIDGE
8 Claims, 4 Drawing Figs.

[52] U.S. Cl. .......... 242/55.19; 179/100.2
[51] Int. Cl. .......... B65h 17/48
[50] Field of Search .......... 242/55.19A, 55.19; 179/100.2Z&A; 274/4 (C&D), 11 (C&D); 352/128, 78

[56] References Cited
UNITED STATES PATENTS

| | | | |
|---|---|---|---|
| 2,714,133 | 7/1955 | Barry .......... | 179/100.2(A) |
| 3,155,335 | 11/1964 | Maeder .......... | 242/55.19(A) |
| 3,235,195 | 2/1966 | Hebb et al. .......... | 242/55.19 |

*Primary Examiner*—Billy S. Taylor
*Attorney*—Lewis H. Eslinger

ABSTRACT: In an endless tape cartridge, an endless magnetic tape and an endless slippery tape are coiled on a rotatable spool with their convolutions arranged alternately, and loops of the magnetic and slippery tapes extending between their innermost and outermost convolutions are guided so that at least a portion of the magnetic tape loop is spaced from the slippery tape loop for engagement individually by a tape drive and also, if desired by one or more magnetic transducers.

INVENTOR.
MASAAKI MORITA
BY
[signature]
ATTORNEY.

ENDLESS TAPE CARTRIDGE

This invention relates generally to endless tape cartridges for use in magnetic recording and reproducing devices.

In existing endless tape cartridges, an endless tape is coiled on a rotatable spool or reel and a loop of the tape extends from the innermost convolution of the tape coil to the outer periphery of the latter and is guided, as by guideposts or pins, so as to pass between a capstan and a pinch roller constituting a drive by which the tape is driven in the direction so as to be withdrawn or unwound from the innermost convolution of the tape coil and rewound on the periphery of the latter in response to the rotation of the spool or reel resulting from the unwinding of the tape therefrom. Since the innermost convolution of the tape is unwound from between the hub of the spool or reel and the next convolution or turn of the tape coil, so that there is considerably relative sliding movement, it has become the usual practice to employ, in endless tape cartridges of the described type, a tape having a layer or coating of a relatively slippery or low-friction substance, such as graphite or the like, on one of its surfaces so as to facilitate the relative sliding movement. Thus, the tape usually employed in endless tape cartridges of the described type generally comprises a nonmagnetic base, for example, of a polyester film, having the low-friction layer of graphite or the like on one surface and a layer or coating of a magnetizable material on its opposite surface.

A disadvantage of the foregoing existing arrangement resides in the fact that the low-friction coating or layer of the tape must be engaged by either the capstan or pinch roller of the tape drive with the result that there is relative slippage between the drive and the tape and the latter is driven at a nonuniform speed. The so-called "wow" occurs by reason of such nonuniform speed of the tape which is an inherent, and hence unavoidable defect of the described arrangement. Further, since a slippery layer is provided on one surface of the magnetic tape, it is not possible to make use of both surfaces of the magnetic tape for recording and reproducing.

Accordingly, it is an object of this invention to provide an endless tape cartridge in which the endless magnetic tape may be driven by a conventional tape drive without any slippage relative to the latter, thereby to make possible the driving of the magnetic tape at a uniform speed and hence to eliminate the so-called wow.

Another object is to provide an endless tape cartridge having the foregoing characteristic, and in which the unwinding and rewinding of the magnetic tape can be smoothly effected.

Still another object is to provide an endless tape cartridge in which the smooth unwinding and rewinding of the magnetic tape is achieved without requiring the provision of a slippery or low-friction surface on the magnetic tape.

A further object is to provide an endless tape cartridge having the foregoing characteristics, and which is adapted to have employed therein a magnetic tape which permits the use of its opposite surfaces for recording and reproducing.

In accordance with an aspect of this invention, an endless tape cartridge is provided with an endless magnetic tape and an endless slippery tape which are coiled on a rotatable reel or spool with their convolutions arranged alternately, and with exposed loops of the magnetic and slippery tapes extending between their innermost and outermost convolutions being guided so that at least a portion of the magnetic tape loop is spaced from the slippery tape loop for engagement of such portion of the magnetic tape loop by a suitable tape drive independently of the slippery tape loop, whereby the magnetic tape may be driven without slippage relative to the tape drive, while the slippery tape makes possible the smooth unwinding and rewinding of the magnetic tape.

The above, and other objects, features and advantages of this invention, will be apparent in the following detailed description of illustrative embodiments thereof which is to be read in connection with the accompanying drawing, wherein.

Figure 1:
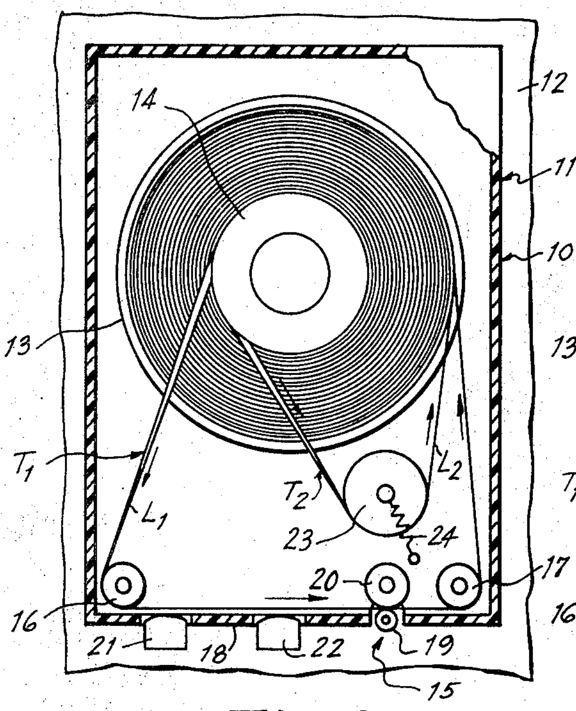
FIG. 1 is a schematic plan view of an endless tape cartridge according to a first embodiment of this invention, and which is shown with the top wall of its housing partly broken away.

Referring to the drawing in detail, and initially to FIG. 1 thereof, it will be seen that an endless tape cartridge 10 according to this invention, as there illustrated, generally comprises a substantially rectangular housing 11 which may be suitably mounted on the deck 12 of a conventional magnetic tape recording and reproducing device. Rotatably mounted within housing 11 is a spool or reel 13 having a hub 14.

Figures 2, 4:
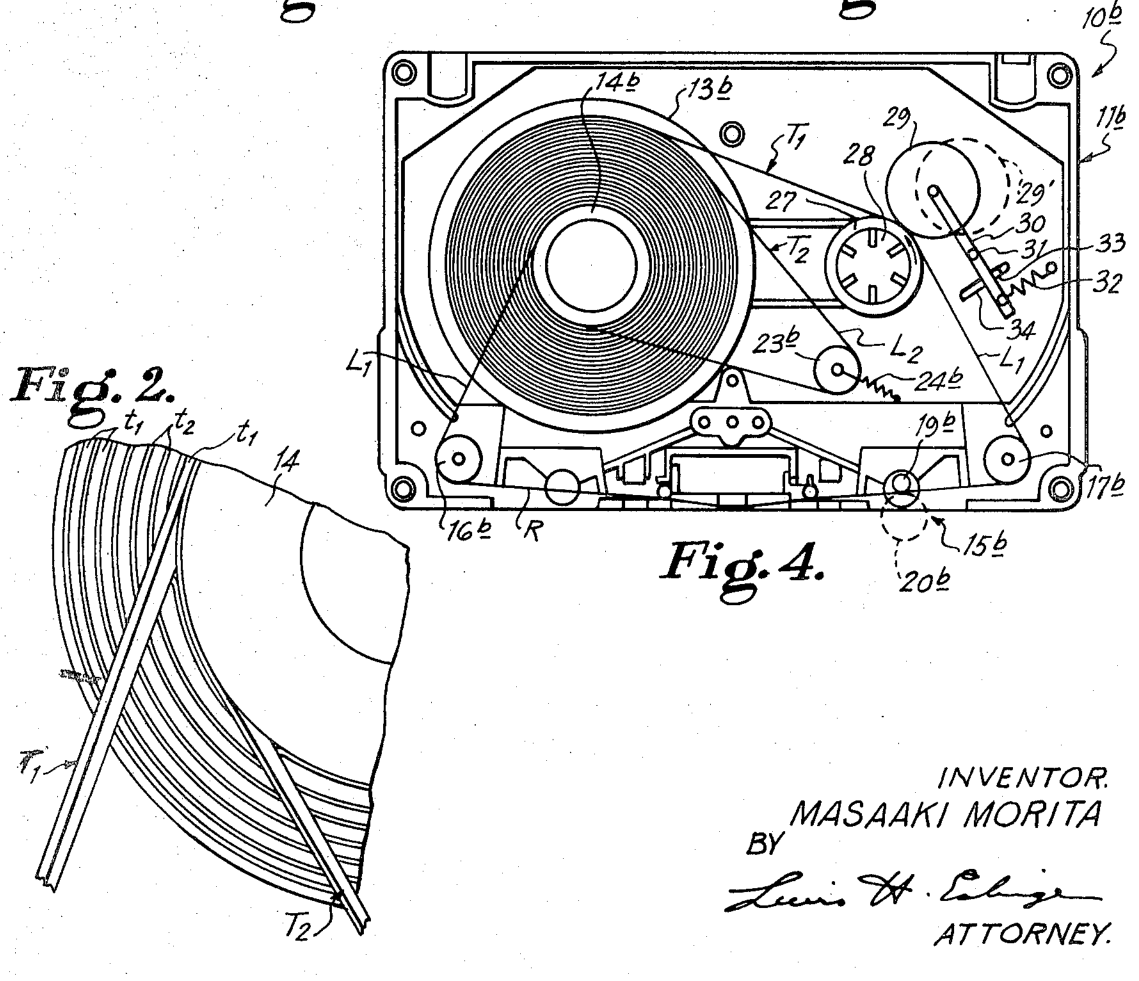
FIG. 2 is an enlarged, fragmentary detail view illustrating the manner in which the convolutions of the magnetic and slippery tapes are alternately arranged on the reel or spool of the cartridge shown on FIG. 1.
FIG. 4 is another view similar to that of FIG. 1, but showing another embodiment of this invention in which fast forwarding of the magnetic tape can be effected.

In accordance with this invention, an endless magnetic tape $T_1$ and an endless slippery tape $T_2$ are coiled on hub 14 of rotatable spool 13 with the convolutions or turns $t_1$ and $t_2$ of the coiled tapes $T_1$ and $T_2$, respectively, being arranged alternately on the spool, as particularly shown on FIG. 2, and further with the innermost convolution of slippery tape $T_2$ being interposed between the innermost convolution of magnetic tape $T_1$ and the surface of spool hub 14. Magnetic and slippery tapes $T_1$ and $T_2$ are shown to have exposed loops $L_1$ and $L_2$ (FIG. 1), respectively, extending between their innermost and outermost convolutions and, in accordance with this invention, such loops $L_1$ and $L_2$ are guided within housing 11 so that at least a portion of the magnetic tape loop $L_1$ is spaced from the slippery tape loop $L_2$ so as to be engageable independently of the latter by a suitable tape drive 15.

In the embodiment shown on FIG. 1, the magnetic tape loop $L_1$ is guided by guide pins or rollers 16 and 17 disposed adjacent the opposite ends of a sidewall 18 of housing 11 in order to establish a straight run R of loop $L_1$ extending parallel to sidewall 18 and passing between a suitably rotated capstan 19 and pinch roller or wheel 20 which together constitute the tape drive 15. The run R of magnetic tape loop $L_1$ is further selectively engageable by magnetic transducers 21 and 22 which are extendable through suitable openings in sidewall 18 and which may respectively constitute an erasing head and a recording and reproducing head.

In the endless tape cartridge 10 as shown, the slippery tape loop $L_2$ is substantially smaller than the magnetic tape loop $L_1$ and is disposed within the latter, with such smaller loop $L_2$ being guided between the innermost and outermost convolutions of tape $T_2$ by means of a single rotatable roller 23 which may be yieldably urged in the direction generally radially away from the center of spool 13, as by a spring 24, so as to suitably tension the slippery tape loop $L_2$.

The endless magnetic tape $T_1$ of cartridge 10 according to this invention may consist of a base of a nonmagnetic material, such as a polyester film, with a coating or layer of a conventional magnetizable material on one or both of the surfaces of such base. Alternatively, the magnetic tape $T_1$ may consist of a film in which the magnetizable material is directly incorporated. The slippery tape $T_2$ of cartridge 10 is preferably nonmagnetic and may consist of a base of polyester film or the like with a layer or coating of a slippery or low-friction material such as, graphite or the like, on one or both of the surfaces of such base, or the tape $T_2$ may consist merely of a film of a material which is slippery, that is, has a low coefficient of friction. Further, as shown on FIG. 2, the slippery tape $T_2$ may have a thickness less than the thickness of the magnetic tape $T_1$ and, in any case, the thickness of slippery tape $T_2$ is preferably no greater than the thickness of magnetic tape $T_1$.

As is indicated by the arrows on FIG. 1, capstan 19 of tape drive 15 is rotated in the direction to drive run R of magnetic tape loop $L_1$ from left to right, as viewed on FIG. 1, whereby magnetic tape $T_1$ is unwound from its innermost convolution on spool 13. Such unwinding of magnetic tape $T_1$ from spool 13 causes rotation of the latter, and magnetic tape $T_1$ is rewound at the periphery of the tape coil on spool 13 in response to such rotation of the latter. The rotation of spool 13 further causes the unwinding of slippery tape $T_2$ from its innermost convolution on spool 13 and the rewinding of the slippery tape at its outermost convolution on the spool. As is shown particularly on FIG. 2, the innermost convolution $t_1$ of magnetic tape $T_1$, at which the latter is being unwound from spool 13, is spaced from hub 14 by the innermost convolution of slippery tape $T_2$ and is also spaced from the next outer convolution of magnetic tape $T_1$ by a convolution of the slippery tape, whereby the slippery tape effectively facilitates the smooth unwinding of the magnetic tape from spool 13. Further, since the smooth unwinding of the magnetic tape from spool 13 is made possible without providing a slippery surface on magnetic tape $T_1$, and since the latter is driven at the loop $L_1$ thereof which is spaced from the loop $L_2$ of the slippery tape, it is apparent that the drive of magnetic tape $T_1$ can be effected by drive 15 without relative slippage, whereby the drive of the magnetic tape can occur at a uniform speed to eliminate objectionable wow.

Since the smooth unwinding of the magnetic tape $T_1$ from spool 13 is achieved without requiring a slippery surface on such tape, it is apparent that both surfaces of tape $T_1$ can be provided with magnetizable layers, thereby to make available both surfaces of the magnetic tape for recording and reproducing. The foregoing is further made possible by the fact that, when magnetic tape $T_1$ is coiled on spool 13, the successive convolutions of the magnetic tape are spaced from each other by the interposed convolutions of slippery tape $T_2$ so that, if both surfaces of the magnetic tape are employed for recording and reproducing, the surfaces of convolutions $t_1$ which face each other on spool 13 cannot have a magnetic effect upon each other.

Figure 3:
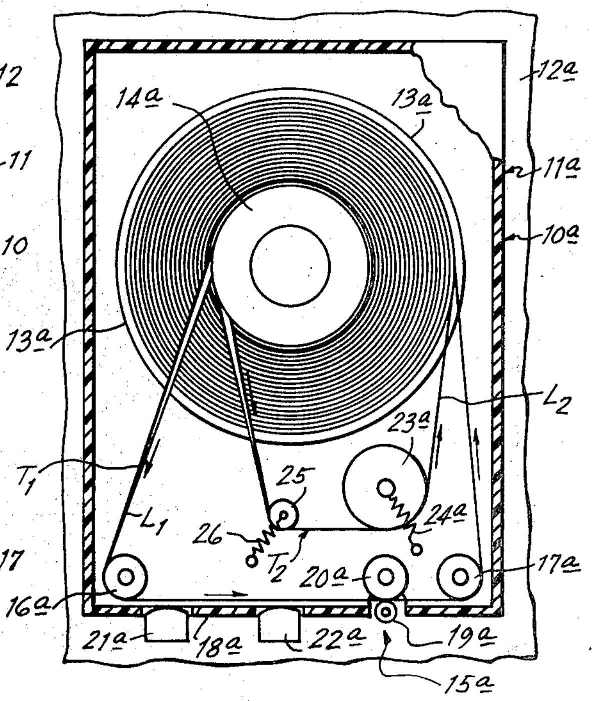
FIG. 3 is a view similar to that of FIG. 1, but showing a modification of the endless tape cartridge.

In the embodiment described above with reference to FIG. 1, the slippery tape $T_2$ is driven merely in response to the rotation of spool 13 resulting from the unwinding of the magnetic tape $T_1$ therefrom. However, if desired, a separate tape drive (not shown) may be provided for driving the slippery tape $T_2$ at a location along its exposed loop $L_2$. Further, as shown on FIG. 3, an endless tape cartridge **10*a*** which is generally similar to the cartridge 10 described above with reference to FIG. 1 and which has its corresponding parts identified by the same reference numerals, but with the letter "*a*" appended thereto, may be provided with an additional guide roller 25 for the exposed loop $L_2$ of slippery tape $T_2$, with such additional guide roller 25 being yieldably urged, as by a spring 26, in the direction opposed to the action of spring **24*a* on guide roller 23*a*. With the arrangement shown on FIG. 3, loop $L_2$ is spaced from loop $L_1$ of the magnetic tape, but, as compared with the arrangement of FIG. 1, there is a relatively smaller angle enclosed between the runs of loops $L_1$ and $L_2$ extending from the unwinding innermost convolutions of the tapes $T_1$ and $T_2$ on spool 13*a*, whereby to more smoothly effect the guiding of tapes $T_1$ and $T_2$, and particularly their unwinding from spool 13*a***.

In endless tape cartridges according to this invention, one or more of the components of the tape drive 15 for the magnetic tape $T_1$ may be mounted within cartridge housing 11. Thus, for example, as shown on FIGS. 1 and 3, the pinch roller 20 of tape drive 15 may be mounted within cartridge housing 11, while the capstan 19 which is mounted on deck 12 of the recording and reproducing device may extend into an opening of the cartridge housing to cooperate with pinch roller 20 in driving run R of the magnetic tape. Alternatively, of course, capstan 19 may be mounted within the cartridge housing along with pinch roller 20 and be engageable by a suitable driving spindle on deck 12, or capstan 19 may be mounted within the cartridge housing, as in the foregoing, and cooperate with a pinch roller which is mounted on the deck 12, or both the capstan and pinch roller may be mounted on the deck and extend into the cartridge housing through an opening in the latter for engagement with the tape run R.

Further, as is shown particularly on FIG. 4, an endless tape cartridge **10*b* in accordance with this invention may be of the type in which means are provided for the fast forwarding of the magnetic tape $T_1$ independently of the normal tape drive 15*b*, for example, as disclosed in detail in the copending application for U.S. Letters Pat., Ser. No. 691,324, filed Dec. 18, 1967, and having a common assignee herewith. In FIG. 4, the several parts of the illustrated cartridge 10*b*** which correspond to the parts of the cartridge 10 described above with reference to FIG. 1 are identified by the same reference numerals, but with the letter "*b*" appended thereto. In the cartridge **10*b*, as shown, the magnetic tape $T_1$ and the slippery tape $T_2$ are coiled, with their convolutions arranged alternately around hub 14*b* of spool 13*b*, and the exposed magnetic tape loop $L_1$ is guided by guide rollers or pins 16*b* and 17*b* so as to have at least a portion thereof, for example, the run R, spaced from the exposed loop $L_2$ of the slippery tape $T_2$ which is guided by the roller 23*b*. As before, magnetic tape $T_1$ is normally driven during recording and reproduction or playback by a tape drive 15*b* constituted by a capstan 19 *b* and a pinch roller 20*b* which, in this case, may be mounted on the deck of the recording and reproducing device and hence is shown in broken lines. In addition to the foregoing components which operate in the same manner as the similarly numbered components of the previously described embodiments, cartridge 10*b* may include a rotatable drive hub or wheel 27 mounted within housing 11*b* so as to be engageable by a run of loop $L_1$, for example, as shown, the run of such loop extending from guide roller 17*b* back to spool 13*b*, with such wheel 27 being rotatable, for example, as by a spindle 28 extending into the cartridge housing from the recording and reproducing device and being rotatably coupled with wheel 27. Further, a pinch roller 29 may be provided rotatably mounted on a lever 30 which is pivoted at 31 and urged by a spring 32 to the position shown in full lines where pinch roller 29 presses magnetic tape $T_1$ against the periphery of drive wheel 27. During normal driving of tape $T_1$ by tape drive 15*b*, pinch roller 29 is displaced to an inoperative position, as indicated in broken lines at 29′, for example, by displacement of a pin 33 extending from the recording and reproducing device through a slot 34 in the cartridge housing and being adapted to suitably act against lever 30. When pinch roller 29 is in its inoperative position 29′, magnetic tape $T_1$ merely slides over the periphery of drive wheel 27. However, when pinch roller 29 is permitted to move to the position shown in full lines on FIG. 4, drive wheel 27 is operative to effect fast forwarding of the magnetic tape, that is, to effect high speed unwinding and rewinding of the magnetic tape, and hence also of the slippery tape $T_2$ in response to the relatively high-speed rotation of spool 13*b***.

Although illustrative embodiments of this invention have been described in detail herein with reference to the accompanying drawing, it is to be understood that the invention is not limited to those precise embodiments, and that various changes and modifications may be effected therein by one skilled in the art without departing from the scope or spirit of the invention.

I claim:

1. In an endless tape cartridge, the combination of a rotatable spool, an endless magnetic tape, an endless tape having a slippery surface, said magnetic tape and said slippery tape being coiled on said spool with their convolutions arranged alternately and with a loop of said magnetic tape extending between the innermost and outermost convolutions thereof and a loop of said slippery tape extending between the innermost and outermost convolutions of said slippery tape, and means guiding said loops of the magnetic and slippery tapes, respectively, so that at least a portion of said loop of magnetic tape is spaced from said loop of slippery tape, and thereby is adapted for engagement individually by a tape drive.

2. An endless tape cartridge according to claim 1, in which said magnetic tape consists of a base of nonmagnetic film and a layer of magnetizable material on at least one of the surfaces of said base.

3. An endless tape cartridge according to claim 2, in which said nonmagnetic base has layers of said magnetizable material on its opposite surfaces.

4. An endless tape cartridge according to claim 1, in which said slippery tape consists of a base of nonmagnetic film and a layer of low-friction material on at least one of the surfaces of said base.

5. An endless tape cartridge according to claim 1, in which said slippery tape consists of a film of low-friction material.

6. An endless tape cartridge according to claim 1, in which said means guiding said loops includes spaced-apart guide members engaged successively by said loop of magnetic tape to establish a run of the latter therebetween for engagement by the tape drive and by magnetic transducer means, and a separate guide member engageable with said loop of the slippery tape.

7. An endless tape cartridge according to claim 1, further having a drive hub rotatable for fast forwarding of the magnetic tape, and a pinch roller selectively displaceable toward said drive hub for engaging said loop of the magnetic tape with said drive hub.

8. An endless tape cartridge according to claim 1, in which said loop of the slippery tape is smaller than, and disposed within said loop of the magnetic tape, and said innermost convolution of the slippery tape is interposed between said innermost convolution of the magnetic tape and said spool.